(12) United States Patent
Kondo

(10) Patent No.: US 8,908,360 B2
(45) Date of Patent: Dec. 9, 2014

(54) ELECTRONIC APPARATUS

(75) Inventor: Shiro Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 42 days.

(21) Appl. No.: 13/547,229

(22) Filed: Jul. 12, 2012

(65) Prior Publication Data

US 2013/0077214 A1    Mar. 28, 2013

(30) Foreign Application Priority Data

Sep. 26, 2011   (JP) .................................. 2011-208823

(51) Int. Cl.
 *H05K 5/00*   (2006.01)
 *H05K 7/00*   (2006.01)
 *G06F 1/16*   (2006.01)
 *F16M 11/08*  (2006.01)

(52) U.S. Cl.
 CPC ........... *F16M 11/08* (2013.01); *F16M 2200/08* (2013.01)
 USPC ............ 361/679.06; 361/679.07; 361/679.21; 361/679.26

(58) Field of Classification Search
 USPC ............. 361/679.06, 679.07, 679.21, 679.26, 361/679.3, 679.55, 679.56; 248/917, 918, 248/919, 921, 922, 923
 See application file for complete search history.

(56) References Cited

U.S. PATENT DOCUMENTS

| | | | |
|---|---|---|---|
| 6,216,989 B1 | 4/2001 | Shioya et al. | |
| 6,781,819 B2 * | 8/2004 | Yang et al. | ............... 361/679.09 |
| 7,331,551 B2 * | 2/2008 | Oddsen, Jr. | ................. 248/279.1 |
| 7,724,511 B2 * | 5/2010 | Jacobs | ....................... 361/679.27 |
| 8,238,086 B2 * | 8/2012 | Ou | ............................ 361/679.21 |
| 2004/0042159 A1 * | 3/2004 | Yang et al. | ..................... 361/680 |
| 2004/0233620 A1 * | 11/2004 | Doczy et al. | ................... 361/680 |

FOREIGN PATENT DOCUMENTS

JP        08-320655 A    12/1996

* cited by examiner

*Primary Examiner* — Anthony Haughton
(74) *Attorney, Agent, or Firm* — Machoff Brennan

(57) ABSTRACT

An electronic apparatus includes an electronic device, a column that supports the electronic device, a plate member connected to a lower end of the column, a support member that includes a lower plate segment disposed under the plate member and an upper plate segment disposed above the plate member and supports the plate member such that the plate member is allowed to swing between the lower plate segment and the upper plate segment, and a wall member that faces a side surface of the plate member to restrict a range of turning of the plate member.

8 Claims, 19 Drawing Sheets

III — III

XI – XI

ELECTRONIC APPARATUS

CROSS-REFERENCE TO RELATED APPLICATION

This application is based upon and claims the benefit of priority of the prior Japanese Patent Application No. 2011-208823, filed on Sep. 26, 2011, the entire contents of which are incorporated herein by reference.

FIELD

The embodiments discussed herein are related to electronic apparatuses.

BACKGROUND

A display, such as a liquid crystal display, may be supported by a display support unit called, for example, a display stand or a display arm. The display support unit is disposed in an installation location, for example, on a desk, and is configured such that the orientation of the display can be changed in accordance with the position of the point of view of a user.

In order to achieve both a reduction in installation space and protection against forward falling arising from the weight of the display, the display support unit has a base, which is placed on, for example, a desk, having front extending part which is long and rear extending part which is short. Accordingly, in the case where the display is positioned in front of the display support unit, the display support unit can be protected from falling. If the display is moved to the rear of the display support unit, it is difficult to protect the display support unit from falling.

Newer display support units are therefore designed such that the display is positioned in front of the display support unit at all times by restricting the range of rotation of a column which supports the display.

The specific structure of a related-art display support unit will be described below.

The display support unit includes a base plate placed on, for example, a desk, a column supporting a display, a rotating plate connected to the lower end of the column, a restricting plate fixed to the lower surface of the rotating plate, a sliding plate, positioned between the base plate and the restricting plate, rotatably supporting the rotating plate, and a restricting pin fixed to the base plate such that the pin extends through a guide hole disposed in the restricting plate.

In the display support unit, when the column supporting the display is rotated, the rotating plate connected to the lower end of the column rotates together with the restricting plate fixed to the rotating plate. At this time, the restricting pin fixed to the base plate slides through the guide hole in the restricting plate in a direction in which the guide hole extends. When the rotating plate rotates by a predetermined angle, therefore, the restricting pin fixed to the base plate reaches one end of the guide hole in the restricting plate, so that the rotating plate is stopped from further rotating. With this structure, the related-art display support unit keeps the display from moving to the rear of the display support unit.

Japanese Laid-open Patent Publication No. 8-320655 discloses an example of related art.

As discussed above, the related-art display support unit has to include special parts, e.g., the restricting plate and the restricting pin, for restricting the rotation range of the display. Disadvantageously, assembly of the display support unit is complicated.

SUMMARY

According to an aspect of the invention, an electronic apparatus includes an electronic device, a column that supports the electronic device, a plate member connected to a lower end of the column, a support member that includes a lower plate segment disposed under the plate member and an upper plate segment disposed above the plate member and supports the plate member such that the plate member is allowed to swing between the lower plate segment and the upper plate segment, and a wall member that faces a side surface of the plate member to restrict a range of turning of the plate member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

Hereinafter, a first embodiment will be described below with reference to FIGS. 1 to 14B.

Schematic Structure of Display Apparatus

The schematic structure of the display apparatus according to this embodiment will now be described with reference to FIGS. 1 and 2.

Figure 1:
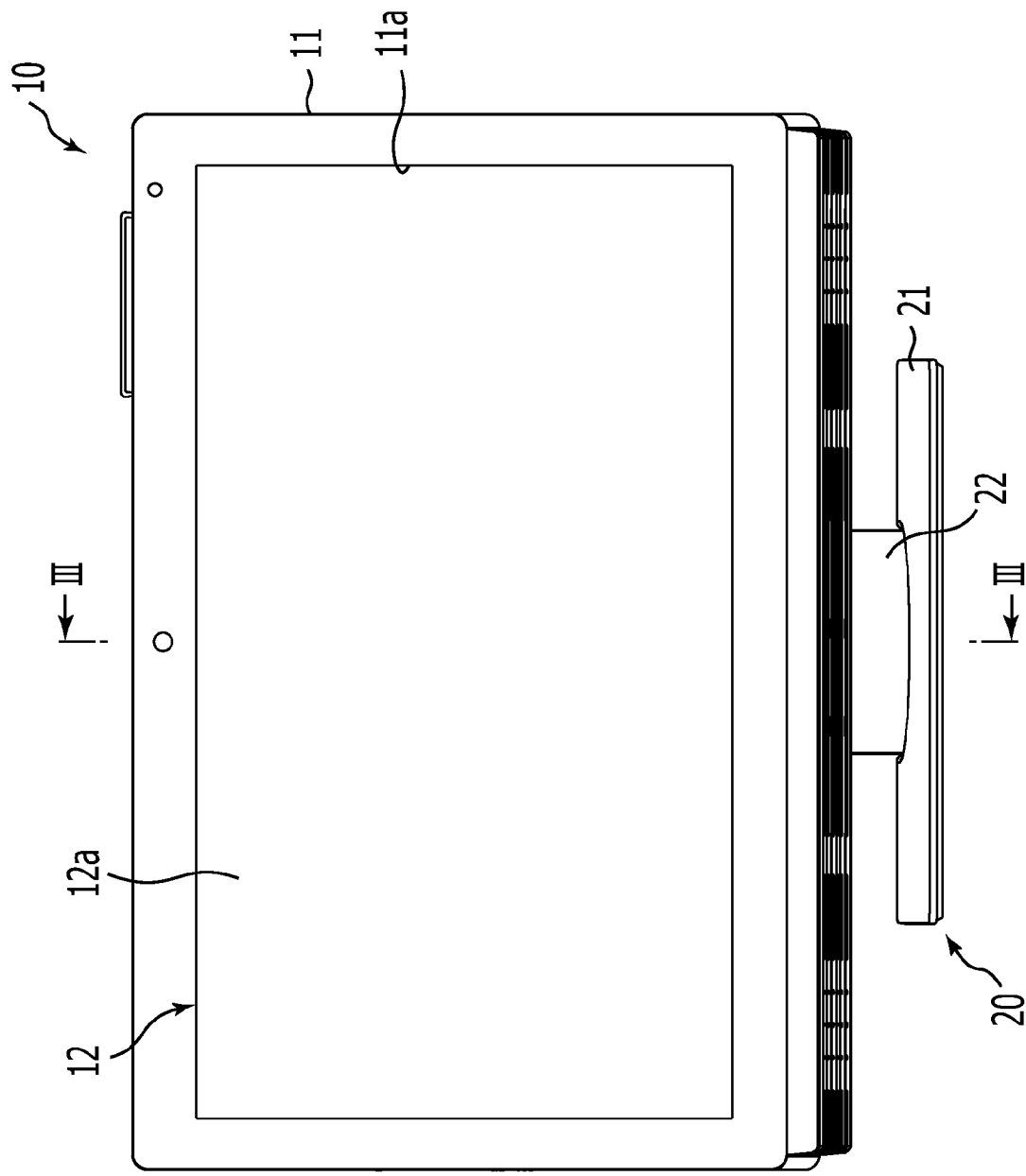
FIG. 1 is a front view of the display apparatus according to a first embodiment.
Figure 2:
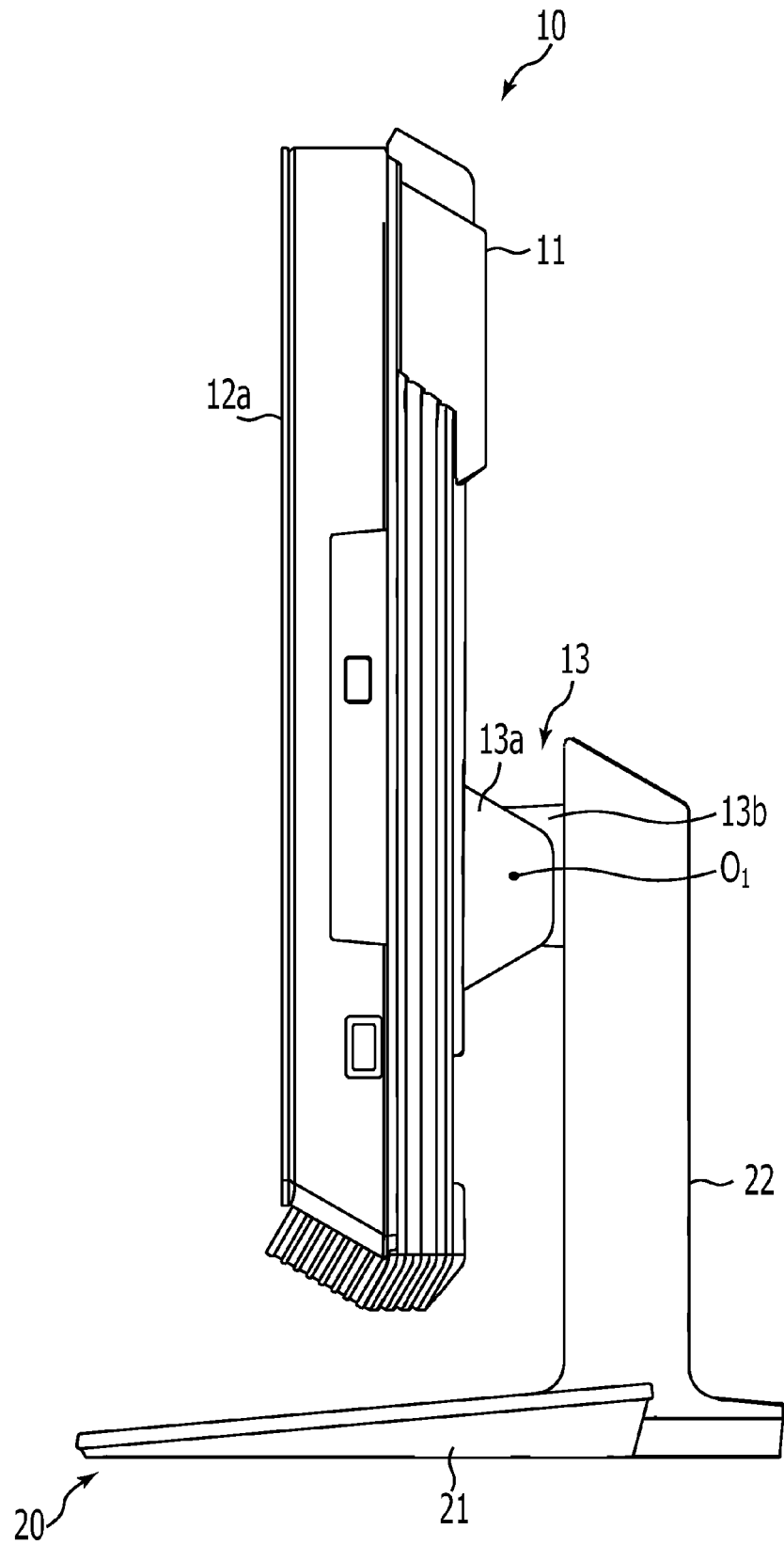
FIG. 2 is a side elevation view of the display apparatus according to the first embodiment.

Referring to FIGS. 1 and 2, the display apparatus according to this embodiment includes a display body 10 and a support unit 20 which supports the display body 10. The display apparatus may be used as a monitor apparatus for a personal computer (PC), for example.

The display body 10 includes a housing 11, a display panel 12, and a connecting member 13. The display body 10 is not particularly limited. For example, a flat panel display, such as an organic electroluminescent (EL) display, a plasma display, or a light emitting diode (LED) display, may be used.

The housing 11 is generally rectangular box-shaped. The housing 11 has a rectangular opening 11a in the front surface thereof. The display panel 12 is positioned in the housing 11 such that a display screen 12a is exposed from the opening 11a of the housing 11.

The connecting member 13 includes a first connector 13a connected to the rear surface of the housing 11 and a second connector 13b connected to a column 22, which will be described later, of the support unit 20. The first and second connectors 13a and 13b are connected to each other such that the connectors are pivotable about an axis $O_1$ orthogonal to the vertical axis. Accordingly, a user can flexibly change the orientation of the display screen 12a in accordance with the level of the point of view of the user.

The support unit 20 according to this embodiment is used to support the display body 10. The embodiment is not limited to this case. The support unit 20 according to this embodiment may be used to support an electronic device other than displays.

Schematic Structure of Support Unit 20

The schematic structure of the support unit 20 according to this embodiment will be described with reference to FIGS. 3 and 4.

Figure 3:
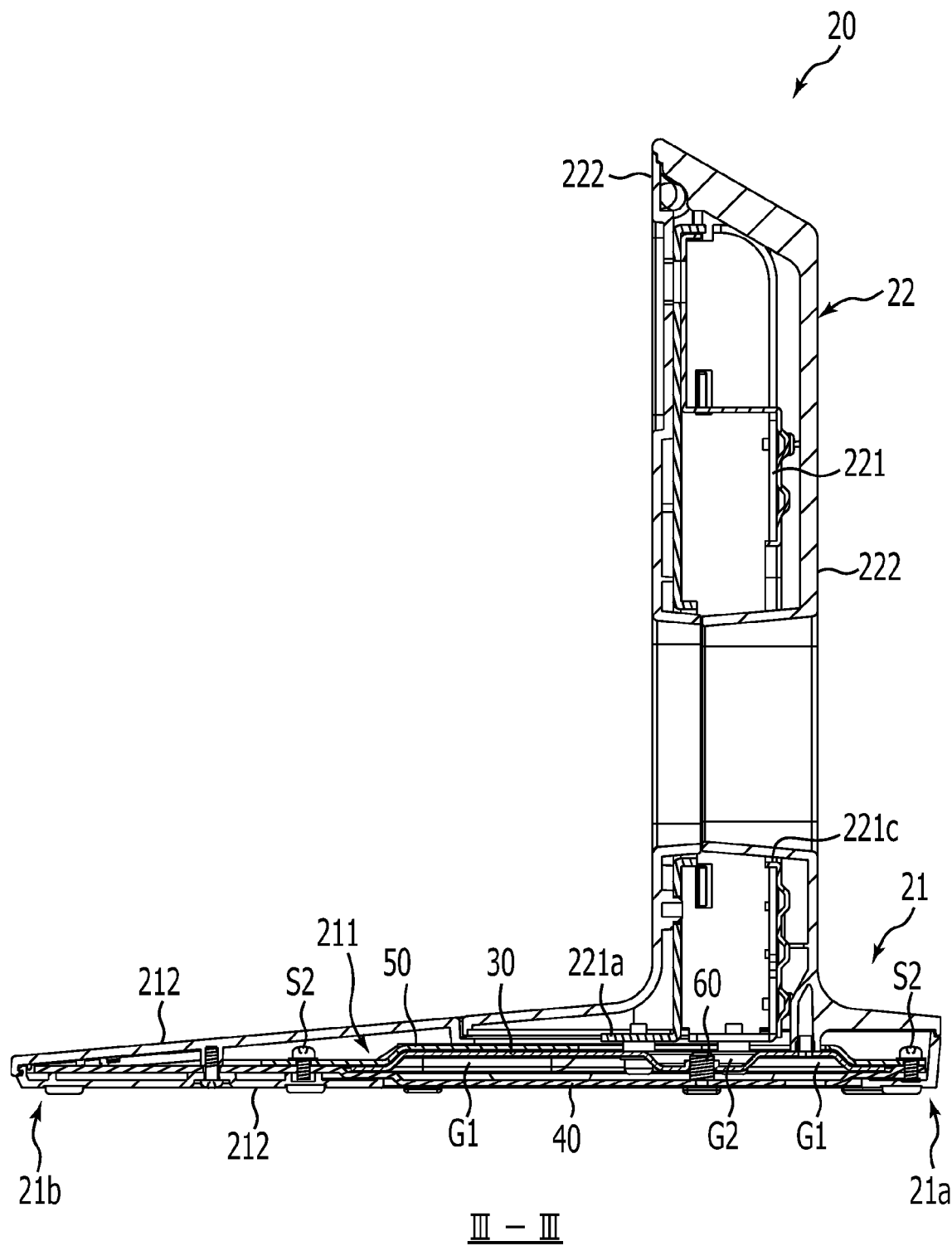
FIG. 3 is a sectional view of the support unit according to the first embodiment.

FIG. 3 is a sectional view of the support unit 20 according to the first embodiment taken along the line III-III in FIG. 1. FIG. 4 is an exploded perspective view of the support unit 20 according to the first embodiment.

Figure 4:
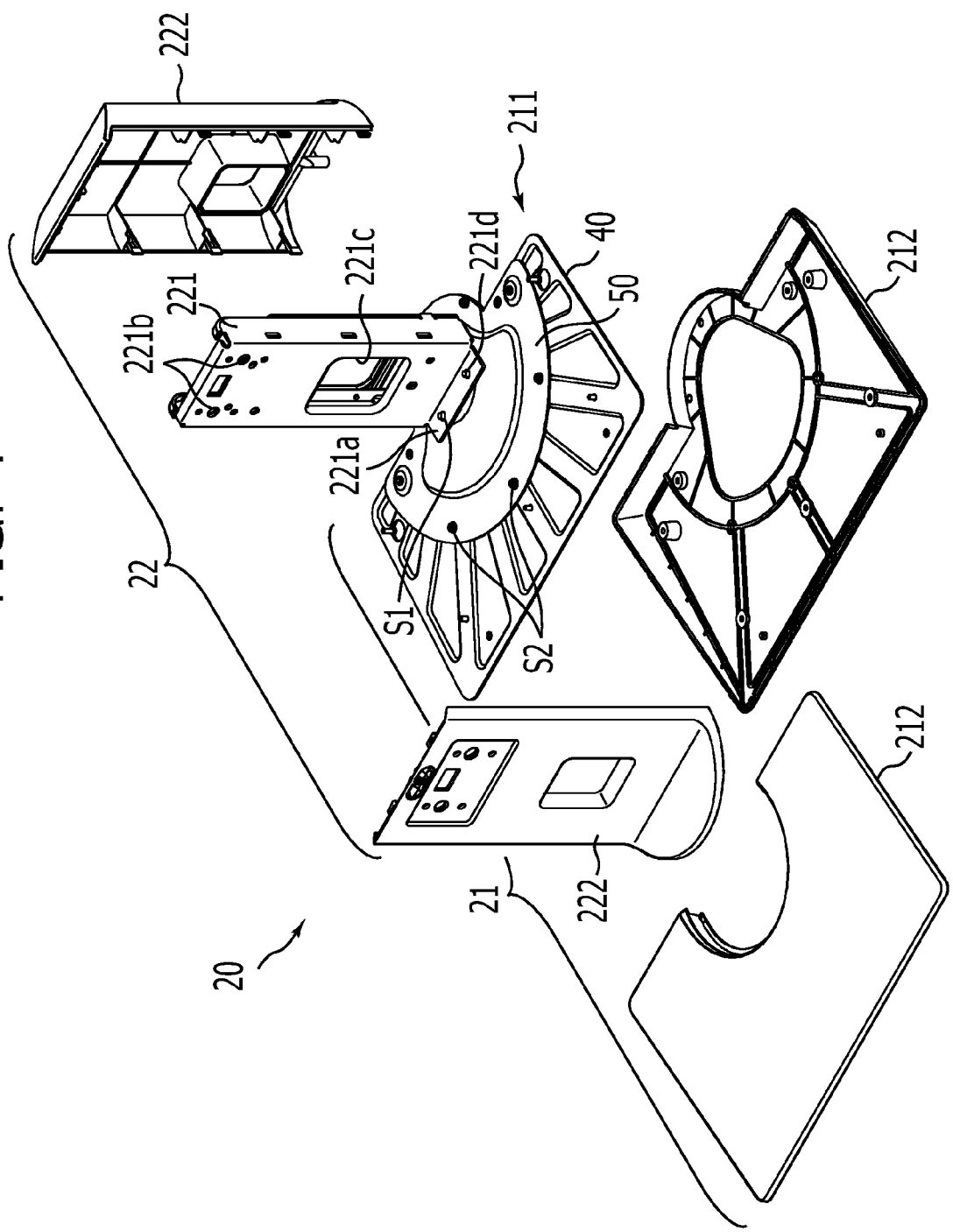
FIG. 4 is an exploded perspective view of the support unit according to the first embodiment.

Referring to FIGS. 3 and 4, the support unit 20 according to this embodiment includes a base 21 placed in an installation location, e.g., on a desk, and the column 22 which upwardly extends from the base 21 and supports the display body 10.

The base 21 includes a first extending portion 21a which extends rearward relative to the column 22 and a second extending portion 21b which extends forward relative to the column 22. The second extending portion 21b forwardly extends over the center of gravity of the display body 10 to protect the display apparatus from falling forward.

The base 21 includes a base body 211 which rotatably supports a column body 221, which will described later, of the column 22 and a decorative panel 212 which covers the base body 211. The structure of the base body 211 will be described in detail later.

The column 22 includes the column body 221 connected to a turning plate 30, which will be described later, of the base 21 and decorative panels 222 which cover the column body 221. The column body 221 is generally rectangular column-shaped. The column body 221 has a flange 221a at the lower end thereof, a plurality of insertion holes 221b in upper end part thereof, and a clearance hole 221c in middle part thereof. The flange 221a is connected to the turning plate 30. The insertion holes 221b allow screws for connecting the display body 10 to the column body 221 to be inserted therein, respectively. The clearance hole 221c allows, for example, a cable of the display body 10 to extend from the rear of the support unit 20. The column body 221 is not particularly limited. For example, a sheet metal part made of a single metal plate may be used. The material of the column body 221 is not particularly limited. In this embodiment, a zinc steel plate is used.

Detailed Structure of Base Body 211

The detailed structure of the base body 211 according to this embodiment will be described below with reference to FIG. 5.

Figure 5:
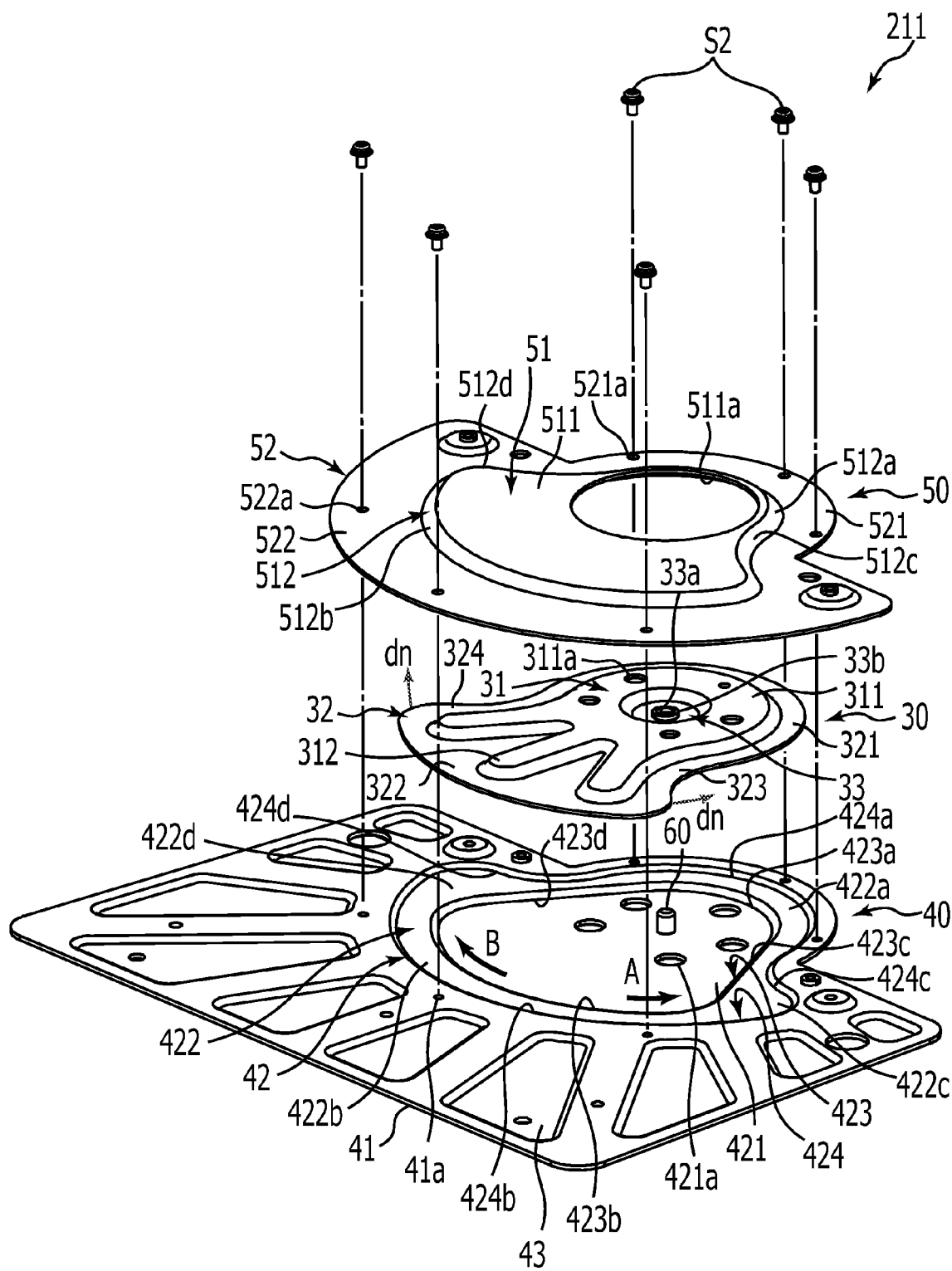
FIG. 5 is an exploded perspective view of the base body according to the first embodiment.

FIG. 5 is an exploded perspective view of the base body 211 according to the first embodiment.

As illustrated in FIG. 5, the base body 211 according to this embodiment includes the turning plate 30 connected to the column body 221 of the column 22, a lower stationary plate 40 positioned under the turning plate 30, an upper stationary plate 50 positioned above the turning plate 30, and a shaft projection 60 which rotatably supports the turning plate 30.

Detailed Structure of Turning Plate 30

Figure 6:
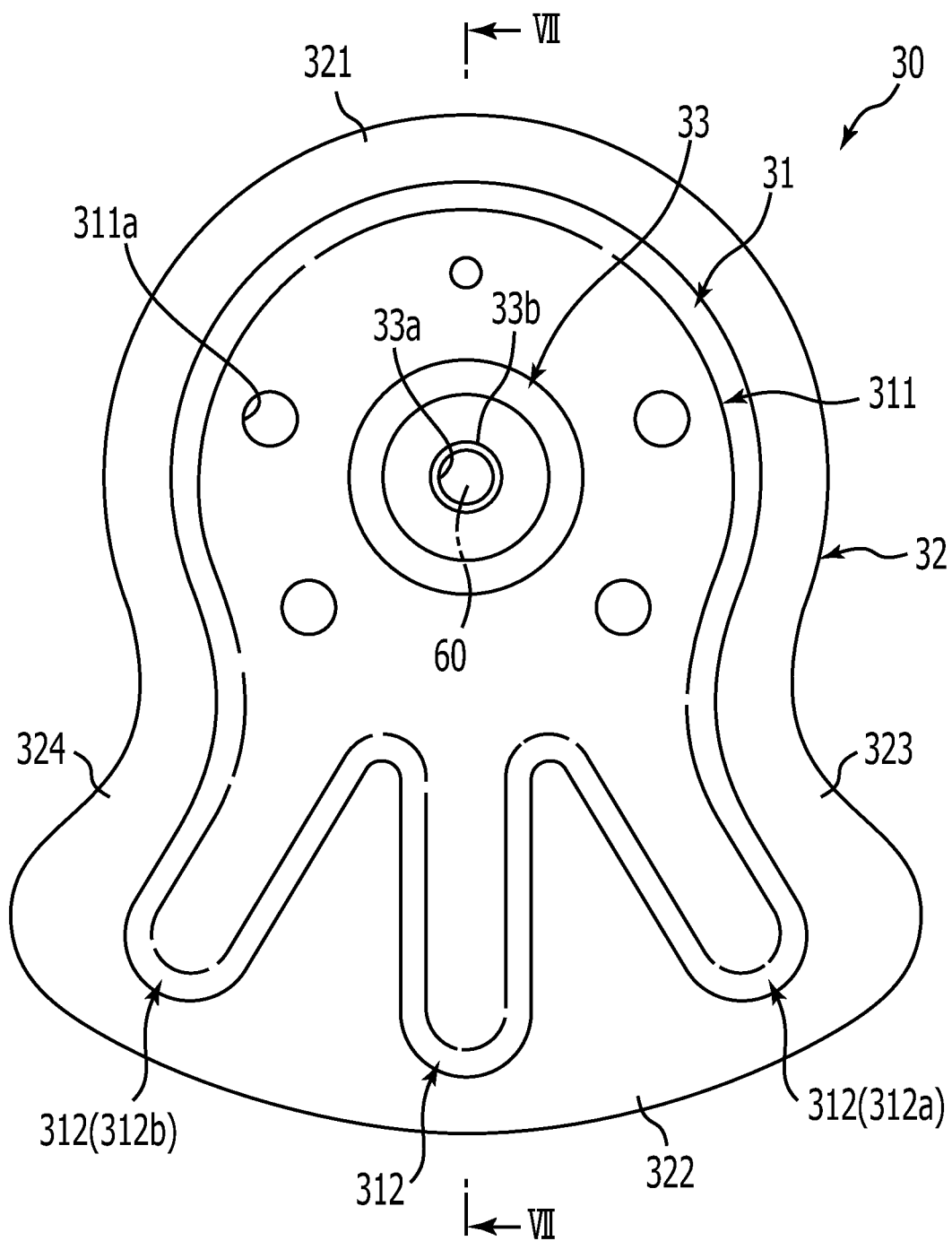
FIG. 6 is a plan view of the turning plate according to the first embodiment.
Figure 7:
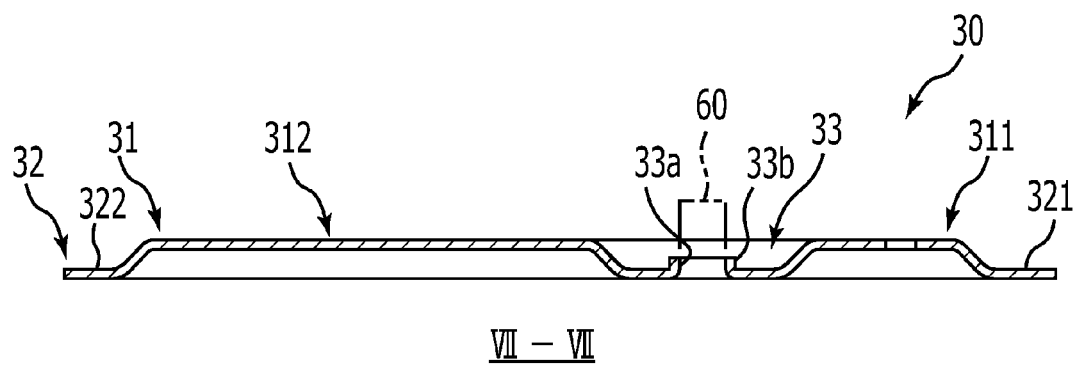
FIG. 7 is a sectional view of the turning plate according to the first embodiment.

FIG. 6 is a plan view of the turning plate 30 according to the first embodiment. FIG. 7 is a sectional view of the turning plate 30 according to the first embodiment taken along the line VII-VII in FIG. 6.

Referring to FIGS. 6 and 7, the turning plate 30 includes a reinforcing bulge 31 with which the turning plate 30 is reinforced, a sliding portion 32 which surrounds the reinforcing bulge 31, and a hollow 33 which surrounds the shaft projection 60.

The turning plate 30 is not particularly limited. For example, a sheet metal part made of a single metal plate may be used. The material of the turning plate 30 is not particularly limited. In this embodiment, a zinc steel plate is used. Furthermore, the surface of the zinc steel plate may be coated with, for example, nickel by electroless plating. The turning plate 30 may have any thickness. In this embodiment, the turning plate 30 has a thickness of approximately 1.2 mm.

The reinforcing bulge 31 is raised from the sliding portion 32, thus increasing the stiffness of the turning plate 30. The reinforcing bulge 31 includes first reinforcing part 311 positioned under the column body 221 and a plurality of second reinforcing parts 312 arranged at the front of the first reinforcing part 311. While three second reinforcing parts 312 are arranged in this embodiment, the embodiment is not limited to this arrangement.

The first reinforcing part 311 is generally ring-shaped and has a plurality of insertion holes 311a arranged in predetermined positions. The insertion holes 311a allow screws S1 for connecting the column body 221 and the turning plate 30 to be inserted therein, respectively. While five insertion holes 311a are arranged in this embodiment, the embodiment is not limited to this arrangement. The second reinforcing parts 312 are connected to the first reinforcing part 311 such that the second reinforcing parts 312 generally radially extend about the shaft projection 60.

The sliding portion 32 is generally ring-shaped such that the sliding portion 32 surrounds the reinforcing bulge 31, and is supported slidably on a supporting portion 422, which will be described later, of the lower stationary plate 40. The sliding portion 32 includes first sliding part 321, second sliding part 322, first connecting part 323, and second connecting part 324, the first and second connecting parts 323 and 324 connecting the first and second sliding parts 321 and 322.

The first sliding part 321 is positioned at the rear of the shaft projection 60 and is generally shaped in an arc whose center coincides with the shaft projection 60. The second sliding part 322 is disposed in front of the shaft projection 60 and is generally shaped in an arc whose center coincides with the shaft projection 60. Note that the radius of curvature of the second sliding part 322 is greater than that of the first sliding part 321. The turning plate 30 according to this embodiment is, therefore, asymmetrical with respect to the front-rear direction thereof. Furthermore, the radius of curvature of the second sliding part 322 about the shaft projection 60 is longer than the distance between the center of the shaft projection 60 and the center of gravity of the display body 10. Accordingly, the display apparatus is protected from falling forward.

The first and second connecting parts 323 and 324 are offset from arc-shaped profiles whose centers coincide with the shaft projection 60. If the turning plate 30 is rotated about the shaft projection 60, therefore, the side surface of the first connecting part 323 or the second connecting part 324 will move in a direction dn (hereinafter, referred to as the "normal direction dn") along the normal to the side surface.

The hollow 33 is positioned in the first reinforcing part 311 and has a rotation support hole 33a for insertion of the shaft projection 60 at the center thereof. As regards a method of forming the hollow 33, for example, drawing is used. The rotation support hole 33a is generally circular and has a boss 33b for reinforcing the rotation support hole 33a at the periphery of the rotation support hole 33a. A method of processing the rotation support hole 33a is not particularly limited. For example, burring may be used. The depth of the hollow 33 is not particularly limited. In this embodiment, the hollow 33 has a depth of approximately 2 mm.

Detailed Structure of Lower Stationary Plate 40

Figure 8:
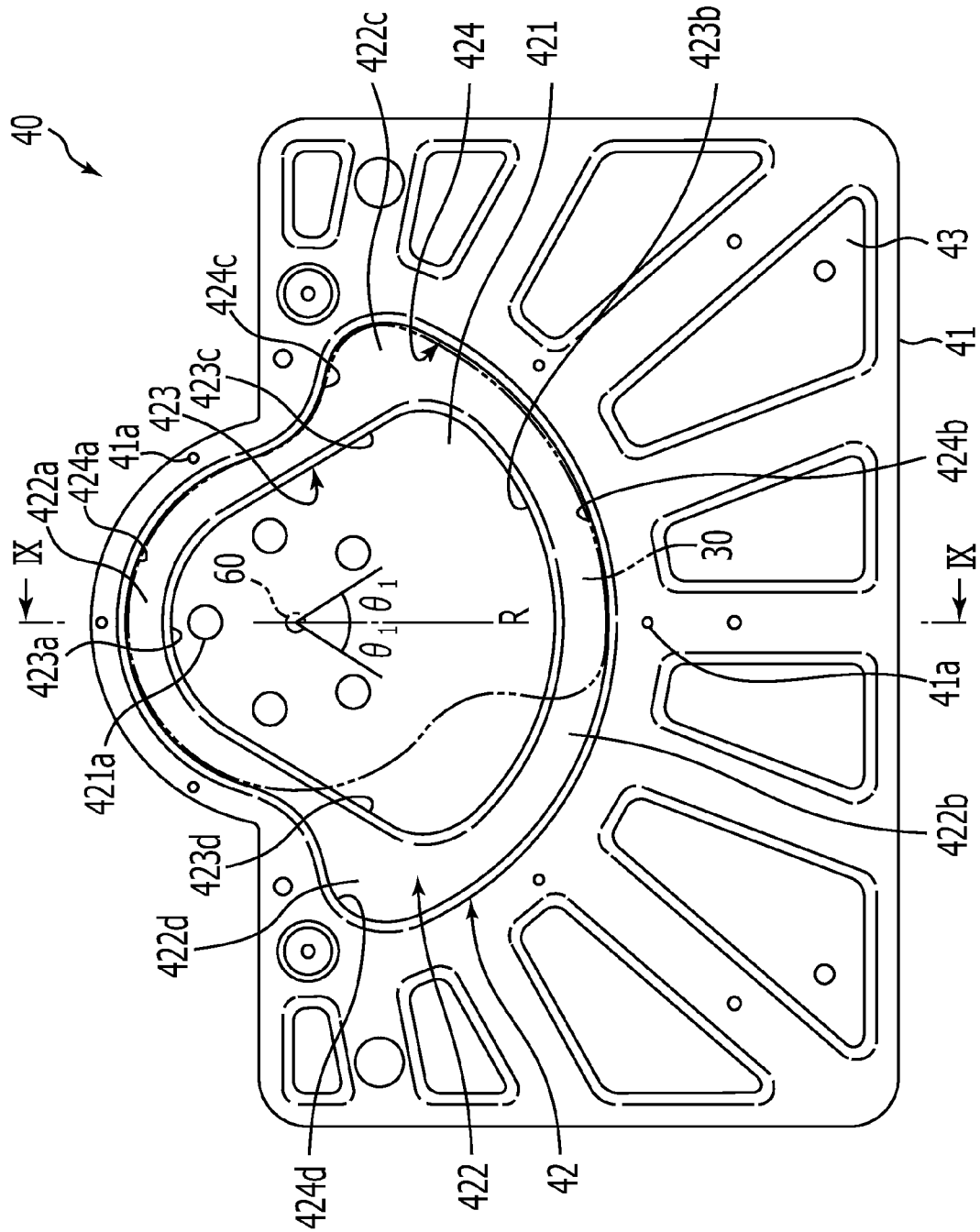
FIG. 8 is a plan view of the lower stationary plate according to the first embodiment.
Figure 9:
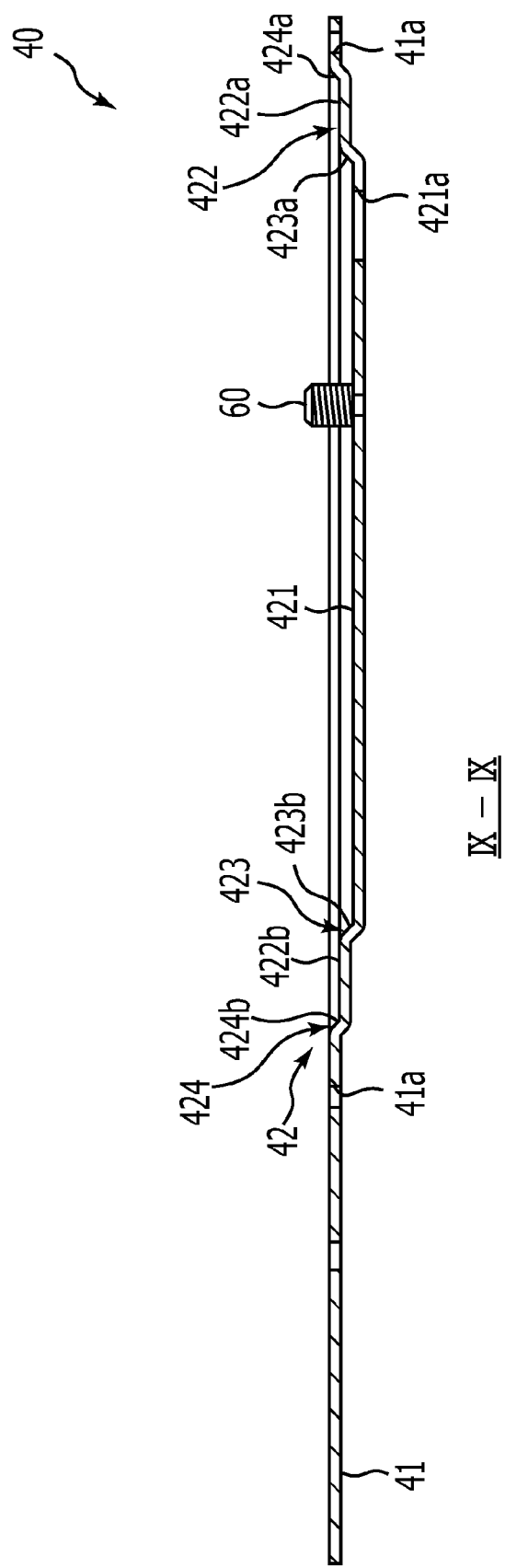
FIG. 9 is a sectional view of the lower stationary plate according to the first embodiment.

FIG. 8 is a plan view of the lower stationary plate 40 according to the first embodiment. FIG. 9 is a sectional view of the lower stationary plate 40 according to the first embodiment taken along the line IX-IX in FIG. 8.

Referring to FIGS. 8 and 9, the lower stationary plate 40 includes a pedestal 41, serving as the bottom of the base body 211, a recess 42 for receiving the turning plate 30, and a plurality of hollows 43 for reinforcing the lower stationary plate 40.

The lower stationary plate 40 is not particularly limited. For example, a sheet metal part made of a single metal plate may be used. The material of the lower stationary plate 40 is not particularly limited. In this embodiment, a zinc steel plate is used. The thickness of the lower stationary plate 40 is not particularly limited. In this embodiment, the lower stationary plate 40 has a thickness of approximately 1.6 mm.

The pedestal 41 is generally rectangular plate-shaped and has a plurality of threaded holes 41a for connecting the lower stationary plate 40 and the upper stationary plate 50 such that the threaded holes 41a are arranged around the recess 42. While six threaded holes 41a are arranged in this embodiment, the embodiment is not limited to this arrangement.

The recess 42 includes a bottom portion 421 which supports the shaft projection 60, the supporting portion 422 which surrounds the bottom portion 421, a first wall 423 which connects the bottom portion 421 and the supporting portion 422, and a second wall 424 which connects the supporting portion 422 and the pedestal 41.

The bottom portion 421 is overlaid with the turning plate 30 such that a predetermined sized gap G1 (refer to FIG. 3) is provided between the bottom portion 421 and the reinforcing bulge 31. The bottom portion 421 is shell-shaped like a scallop. The shaft projection 60 is disposed at a predetermined position in the bottom portion 421. The shaft projection 60 is generally columnar. A plurality of clearance holes 421a which permit the screws S1 to reach the insertion holes 311a of the turning plate 30 are arranged around the shaft projection 60. The positions of the clearance holes 421a and the number thereof correspond to those of the insertion holes 311a of the turning plate 30. Furthermore, the inside diameter of each clearance hole 421a is greater than the outside diameter of the head of the screw S1.

The supporting portion 422 is generally ring-shaped such that the supporting portion 422 surrounds the bottom portion 421. The sliding portion 32 of the turning plate 30 is slidably placed on the surface of the supporting portion 422. The surface of the supporting portion 422 may be supplied with a lubricant, such as grease.

The supporting portion 422 is positioned at an intermediate level between the bottom portion 421 and the pedestal 41. The distance between the upper surface of the supporting portion 422 and that of the pedestal 41 is equal to or slightly less than the thickness of the sliding portion 32 of the turning plate 30. Accordingly, when the sliding portion 32 of the turning plate 30 is placed on the supporting portion 422, the sliding portion 32 does not protrude upwardly higher than the pedestal 41.

The supporting portion 422 is defined by the first wall 423 and the second wall 424 and includes first supporting part 422a, second supporting part 422b, first connecting part 422c, and second connecting part 422d, the first and second connecting parts 422c and 422d connecting the first and second supporting parts 422a and 422b.

The first supporting part 422a is positioned at the rear of the shaft projection 60 and is generally arc- and belt-shaped such that the center of the first supporting part 422a coincides with the shaft projection 60. The width of the first supporting part 422a along the radius thereof is determined by the first and second walls 423 and 424 such that at least the curved end or end surface of the first sliding part 321 of the turning plate 30 is positioned within the range of the first supporting part 422a.

The second supporting part 422b is positioned in front of the shaft projection 60 and is generally arc- and belt-shaped such that the center of the second supporting part 422b coincides with the shaft projection 60. The width of the second supporting part 422b along the radius thereof is determined by the first and second walls 423 and 424, similarly to the first supporting part 422a, such that at least the curved end or end surface of the second sliding part 322 of the turning plate 30 is positioned within the range of the second supporting part 422b.

The first and second connecting parts 422c and 422d smoothly connect the first and second supporting parts 422a and 422b. The first and second connecting parts 422c and 422d may have any contour and size. The contours and sizes of the first and second connecting parts 422c and 422d are determined by first and second connecting wall parts 423c and 423d of the first wall 423 and first and second connecting wall parts 424c and 424d of the second wall 424.

The first wall 423 is generally ring-shaped and defines the inner edge of the supporting portion 422. The first wall 423 includes first arc-shaped wall part 423a, second arc-shaped wall part 423b, and the first and second connecting wall parts 423c and 423d which connect the first and second arc-shaped wall parts 423a and 423b.

The first arc-shaped wall part 423a is positioned at the rear of the shaft projection 60 and is generally shaped in an arc whose center coincides with the shaft projection 60. The radius of curvature of the first arc-shaped wall part 423a about the shaft projection 60 is less than that of the first sliding part 321 of the turning plate 30. Accordingly, the first supporting part 422a reliably supports the first sliding part 321 of the turning plate 30.

The second arc-shaped wall part 423b is positioned in front of the shaft projection 60 and is generally shaped in an arc whose center coincides with the shaft projection 60. The radius of curvature of the second arc-shaped wall part 423b about the shaft projection 60 is less than that of the second sliding part 322 of the turning plate 30. Accordingly, the second supporting part 422b reliably supports the second sliding part 322 of the turning plate 30.

The first and second connecting wall parts 423c and 423d smoothly connect the first and second arc-shaped wall parts 423a and 423b. The first and second connecting wall parts 423c and 423d may have any contour and size.

The second wall 424 is generally ring-shaped and defines the outer edge of the supporting portion 422. The second wall 424 includes first arc-shaped wall part 424a, second arc-shaped wall part 424b, and the first and second connecting wall parts 424c and 424d which connect the first and second arc-shaped wall parts 424a and 424b.

The first arc-shaped wall part 424a is positioned at the rear of the shaft projection 60 and is generally shaped in an arc whose center coincides with the shaft projection 60. The radius of curvature of the first arc-shaped wall part 424a about the shaft projection 60 is slightly greater than that of the first sliding part 321 of the turning plate 30 about the shaft projection 60. Accordingly, the first arc-shaped wall part 424a faces the curved surface or end surface of the first sliding part 321 of the turning plate 30, with a slight gap therebetween.

The second arc-shaped wall part 424b is positioned in front of the shaft projection 60 and is generally shaped in an arc whose center coincides with the shaft projection 60. The second arc-shaped wall part 424b is positioned such that the reference axis R intersecting the shaft projection 60 in the front-rear direction divides the central angle of the second arc-shaped wall part 424b into two parts. The radius of curvature of the second arc-shaped wall part 424b about the shaft projection 60 is slightly greater than that of the second sliding part 322 of the turning plate 30 about the shaft projection 60. Accordingly, the second arc-shaped wall part 424b faces the curved surface or end surface of the second sliding part 322 of the turning plate 30, with a slight gap therebetween. Furthermore, the arc of the second arc-shaped wall part 424b is longer than that of the second sliding part 322 of the turning plate 30. Accordingly, when the turning plate 30 is rotated about the shaft projection 60, the first and second sliding parts 321 and 322 of the turning plate 30 move along first and second arc-shaped wall parts 512a and 512b in a space between the supporting portion 422 of the lower stationary plate 40 and a stationary portion 52 of the upper stationary plate 50.

The first and second connecting wall parts 424c and 424d smoothly connect the first and second arc-shaped wall parts 424a and 424b. The contours of the first and second connecting wall parts 424c and 424d correspond to those of the first and second connecting parts 323 and 324 of the turning plate 30 when the turning plate 30 is rotated by a predetermined angle $\theta_1$ in right and left directions (indicated by the arrows A and B in FIG. 5) with respect to the reference axis R intersecting the shaft projection 60 in the front-rear direction.

Accordingly, when the turning plate 30 is rotated by the predetermined angle $\theta_1$ in the right and left directions with respect to the reference axis R intersecting the shaft projection 60 in the front-rear direction, the first and second connecting parts 323 and 324 of the turning plate 30 abut against the first and second connecting wall parts 424c and 424d of the lower stationary plate 40, respectively, thus restricting further rotation of the turning plate 30. In other words, the first and second connecting wall parts 424c and 424d of the lower stationary plate 40 and the first and second connecting parts 323 and 324 of the turning plate 30 function as a restricting unit that restricts the range of rotation of the turning plate 30.

Detailed Structure of Upper Stationary Plate 50

Figure 10:
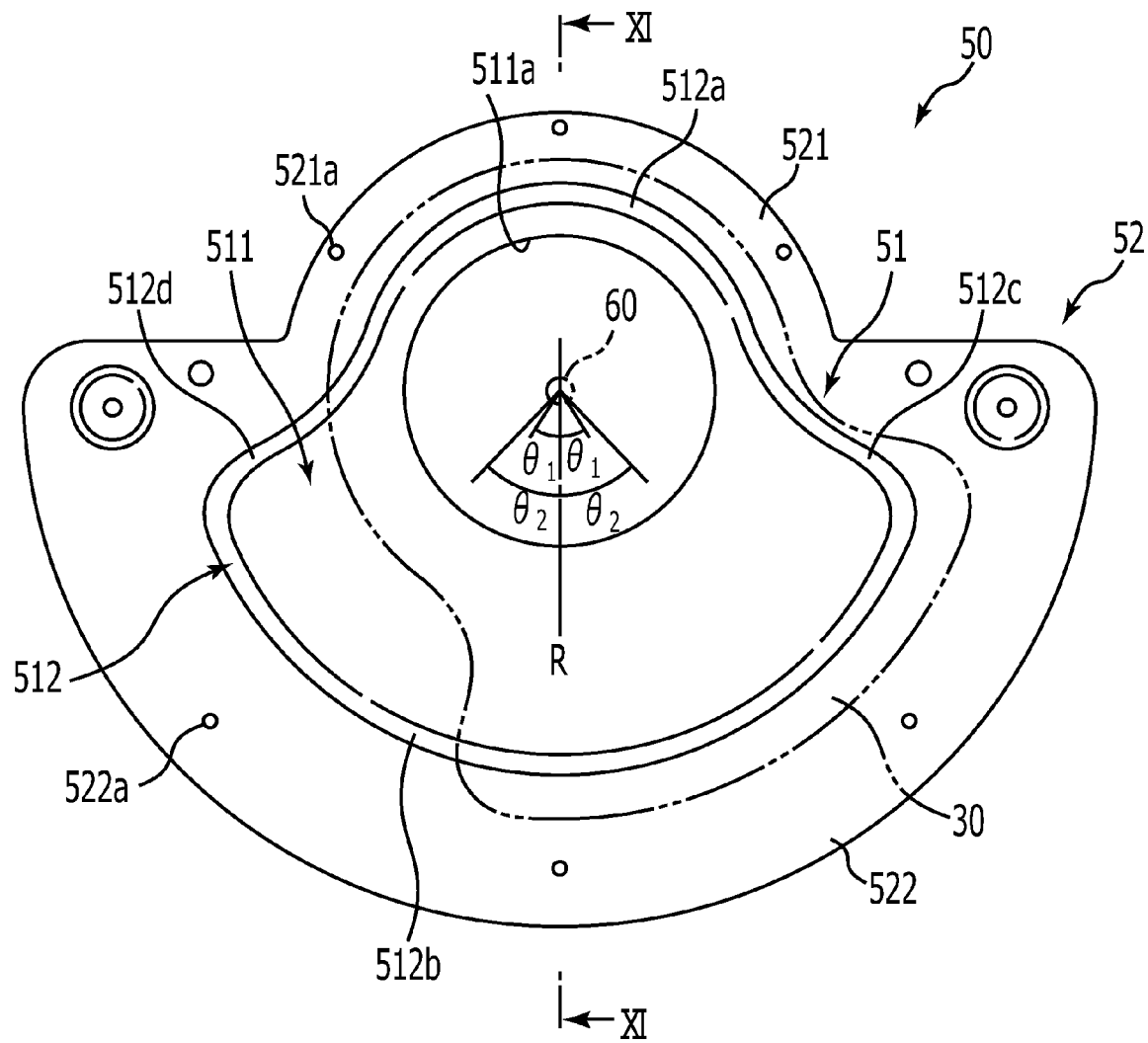
FIG. 10 is a plan view of the upper stationary plate according to the first embodiment.
Figure 11:
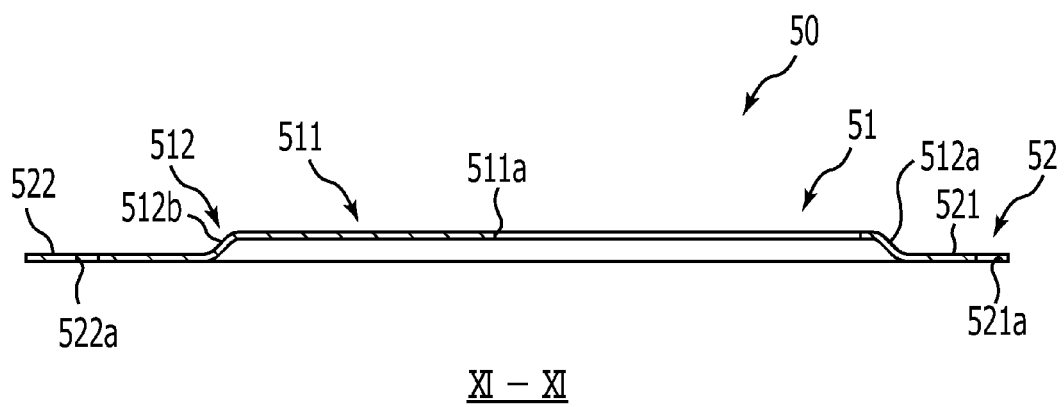
FIG. 11 is a sectional view of the upper stationary plate according to the first embodiment.

FIG. 10 is a plan view of the upper stationary plate 50 according to the first embodiment. FIG. 11 is a sectional view of the upper stationary plate 50 according to the first embodiment taken along the line XI-XI in FIG. 10.

Referring to FIGS. 10 and 11, the upper stationary plate 50 includes a receiving bulge 51 which receives the reinforcing bulge 31 of the turning plate 30 and the stationary portion 52 which surrounds the receiving bulge 51. The upper stationary plate 50 is not particularly limited. For example, a sheet metal part made of a single metal plate may be used. The material of the upper stationary plate 50 is not particularly limited. In this embodiment, a zinc steel plate is used. The thickness of the upper stationary plate 50 is not particularly limited. In this embodiment, the upper stationary plate 50 has a thickness of approximately 1.2 mm.

The receiving bulge 51 protrudes upwardly higher than the stationary portion 52. A predetermined sized gap G2 (refer to FIG. 3) for receiving the turning plate 30 is provided between the supporting portion 422 of the lower stationary plate 40 and the receiving bulge 51 of the upper stationary plate 50. The size of the gap G2 is not particularly limited. The size may be determined such that the turning plate 30 does not interfere with the upper stationary plate 50 upon rotation about the shaft projection 60.

The receiving bulge 51 includes a lid part 511 positioned in parallel to the stationary portion 52 and a wall 512 connecting the lid part 511 to the stationary portion 52.

The lid part 511 is generally sector-shaped and has an opening 511a for connection of the base body 211 and the column body 221 such that the opening 511a corresponds to the first reinforcing part 311 of the turning plate 30. The opening 511a is generally circular and allows the insertion holes 311a arranged in the turning plate 30 to be exposed.

The wall 512 is generally ring-shaped and defines the outer edge of the lid part 511. The wall 512 includes the first arc-shaped wall part 512a, the second arc-shaped wall part 512b, first connecting wall part 512c, and second connecting wall part 512d, the first and second connecting wall parts 512c and 512d connecting the first and second arc-shaped wall parts 512a and 512b.

The first arc-shaped wall part 512a is positioned at the rear of the shaft projection 60 and is generally shaped in an arc whose center coincides with the shaft projection 60. The radius of curvature of the first arc-shaped wall part 512a about the shaft projection 60 is greater than that of the first reinforcing part 311 of the turning plate 30 about the shaft projection 60. Accordingly, when the turning plate 30 is rotated about the shaft projection 60, the first reinforcing part 311 of the turning plate 30 moves along the inner surface of the first arc-shaped wall part 512a inside the receiving bulge 51.

The second arc-shaped wall part 512b is positioned in front of the shaft projection 60 and is generally shaped in an arc whose center coincides with the shaft projection 60. The second arc-shaped wall part 512b is positioned such that the reference axis R intersecting the shaft projection 60 in the front-rear direction divides the central angle of the second arc-shaped wall part 512b into two parts. The radius of curvature of the second arc-shaped wall part 512b about the shaft projection 60 is longer than the distance between the center of the shaft projection 60 and the extremity of each second reinforcing part 312 of the turning plate 30. In addition, the arc of the second arc-shaped wall part 512b is longer than that of an aerial sector Ia which the second reinforcing parts 312 of the turning plate 30 are inscribed in and which includes all of the second reinforcing parts 312. Accordingly, when the turning plate 30 is rotated about the shaft projection 60, the second reinforcing parts 312 of the turning plate 30 move along the inner surface of the second arc-shaped wall part 512b inside the receiving bulge 51.

The first and second connecting wall parts 512c and 512d smoothly connect the first and second arc-shaped wall parts 512a and 512b. The contours of the first and second connecting wall parts 512c and 512d correspond to those of the leading extremities of the second reinforcing parts 312 of the turning plate 30 in the moving direction thereof when the turning plate 30 is rotated by a predetermined angle $\theta_2$ ($>\theta_1$) to the left and right with respect to the reference axis R intersecting the shaft projection 60 in the front-rear direction. For example, when the turning plate 30 is rotated to the left, part indicated by 312a, reference numeral within parentheses in FIG. 6, is the leading extremity of the second reinforcing part 312 in the moving direction. When the turning plate 30 is rotated to the right, part indicated by 312b, reference numeral within parentheses in FIG. 6, is the leading extremity of the second reinforcing part 312 in the moving direction.

Accordingly, when the turning plate 30 is rotated about the shaft projection 60 by the predetermined angle $\theta_1$ to the left and right such that the first and second connecting parts 323 and 324 of the turning plate 30 abut in turn against the first and second connecting wall parts 424c and 424d of the lower stationary plate 40, respectively, the second reinforcing parts 312 of the turning plate 30 do not come into contact with the first and second connecting wall parts 512c and 512d.

The stationary portion 52 is generally ring-shaped and surrounds the receiving bulge 51. The stationary portion 52 includes first stationary part 521 and second stationary part 522 connected to each other.

The first stationary part 521 is positioned at the rear of the shaft projection 60 and is generally shaped in an arc whose center coincides with the shaft projection 60. The radius of curvature of the first stationary part 521 about the shaft projection 60 is greater than that of the first arc-shaped wall part 424a of the lower stationary plate 40 about the shaft projection 60. Accordingly, the first stationary part 521 coincides with part of the pedestal 41 positioned at the rear of the first supporting part 422a of the lower stationary plate 40. The first stationary part 521 is in tight contact with the surface of the pedestal 41 of the lower stationary plate 40. The first stationary part 521 has a plurality of insertion holes 521a for insertion of screws S2 connecting the lower stationary plate 40 and the upper stationary plate 50 such that the insertion holes 521a correspond to the threaded holes 41a of the lower stationary plate 40.

The second stationary part 522 is positioned in front of the shaft projection 60 and is generally shaped in an arc whose center coincides with the shaft projection 60. The radius of curvature of the second stationary part 522 about the shaft projection 60 is greater than that of the second arc-shaped wall part 424b of the lower stationary plate 40 about the shaft projection 60. Accordingly, the second stationary part 522 coincides with part of the pedestal 41 positioned in front of the second supporting part 422b of the lower stationary plate 40. The second stationary part 522 is in tight contact with the surface of the pedestal 41 of the lower stationary plate 40. The second stationary part 522 has a plurality of insertion holes 522a for insertion of the screws S2 connecting the lower stationary plate 40 and the upper stationary plate 50 such that the insertion holes 522a correspond to the threaded holes 41a of the lower stationary plate 40.

Attachment of Column Body 221 to Base Body 211

Figure 12:
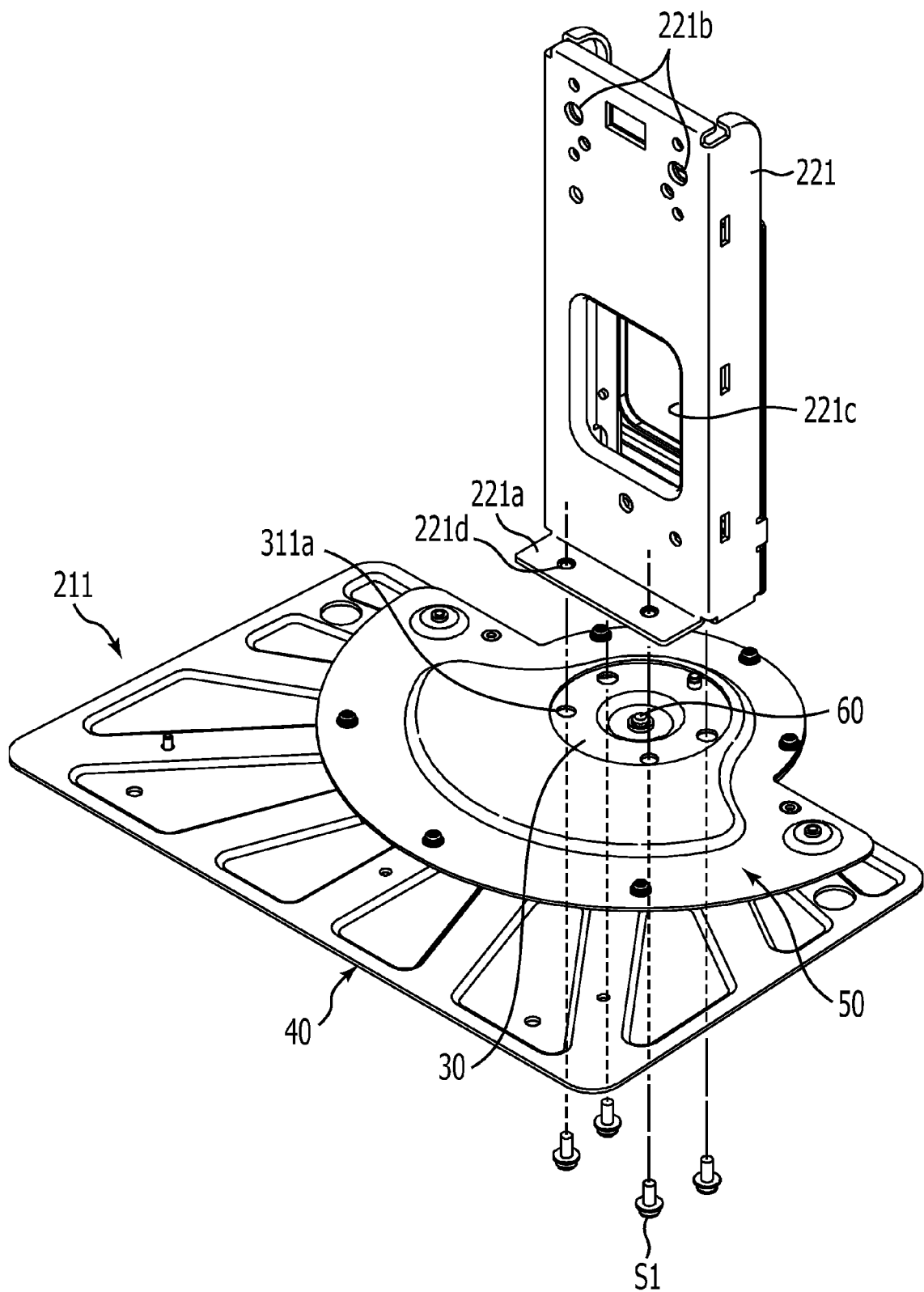
FIG. 12 is an exploded perspective view of the connection between the base body and the column body according to the first embodiment.
Figure 13:
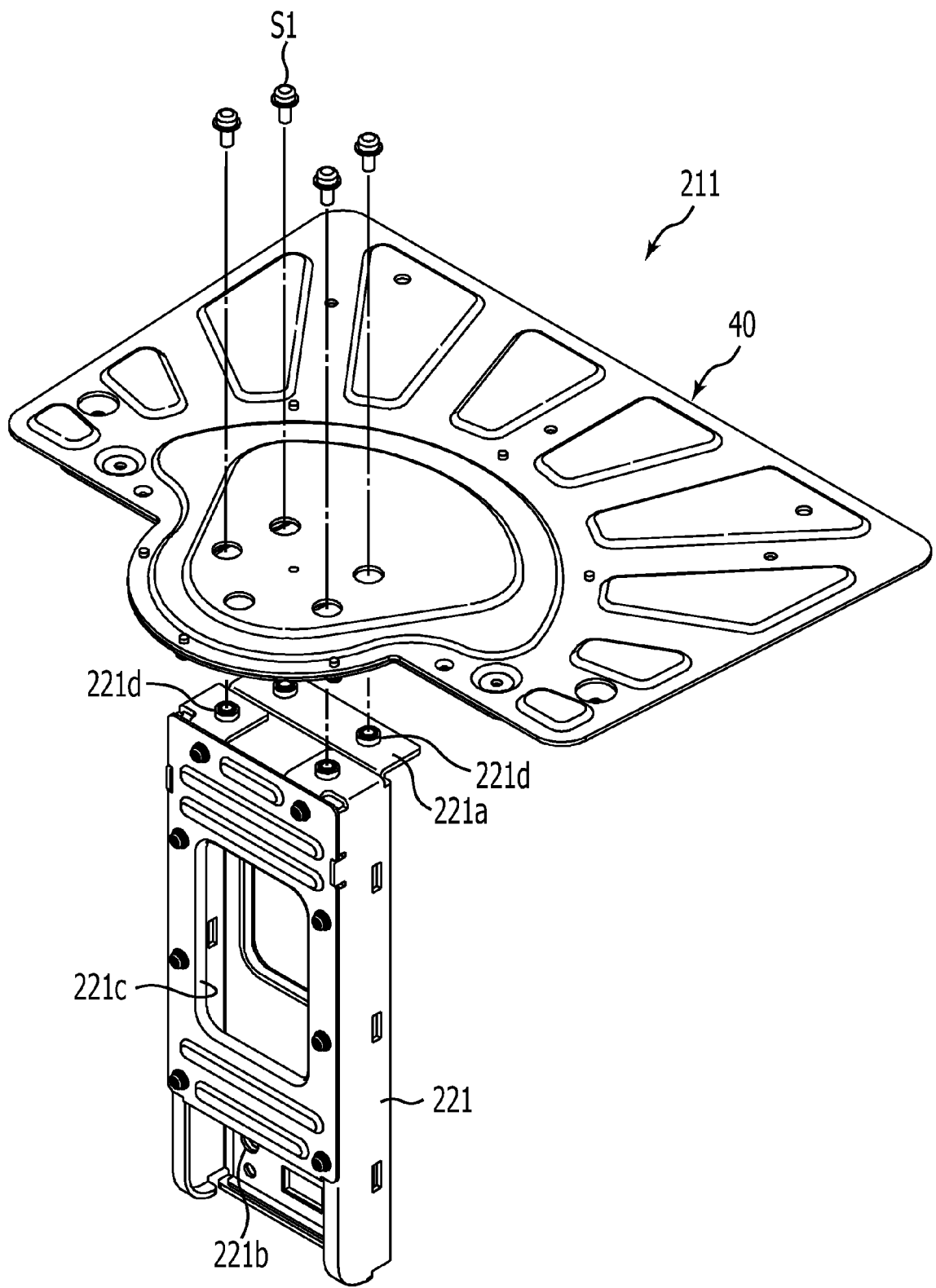
FIG. 13 is an exploded perspective view of the connection between the base body and the column body according to the first embodiment.

FIG. 12 is an exploded perspective view of the connection between the base body 211 and the column body 221 according to the first embodiment when viewed obliquely from above. FIG. 13 is an exploded perspective view of the connection between the base body 211 and the column body 221 according to the first embodiment when viewed obliquely from below.

Referring to FIGS. 12 and 13, the column body 221 according to this embodiment is connected to the turning plate 30 of the base body 211 by the screws S1. The screws S1, inserted from below the base body 211 into the insertion holes 311a arranged in the turning plate 30, are engaged with a plurality of threaded holes 221d arranged in the column body 221. The clearance holes 421a are arranged in the bottom portion 421 of the lower stationary plate 40 in order to give the screws S1 access to the insertion holes 311a of the turning plate 30 from below the base body 211. Since the column body 221 can be connected to the base body 211 after assembly of the base body 211, therefore, the number of parts to be simultaneously fit together is small. Advantageously, an operation of assembling the support unit 20 according to this embodiment is greatly simplified as compared to related art.

Operations of Display Body 10 and Turning Plate 30

Operations of the display apparatus will now be described with reference to FIGS. 14A and 14B.

Figure 14A:
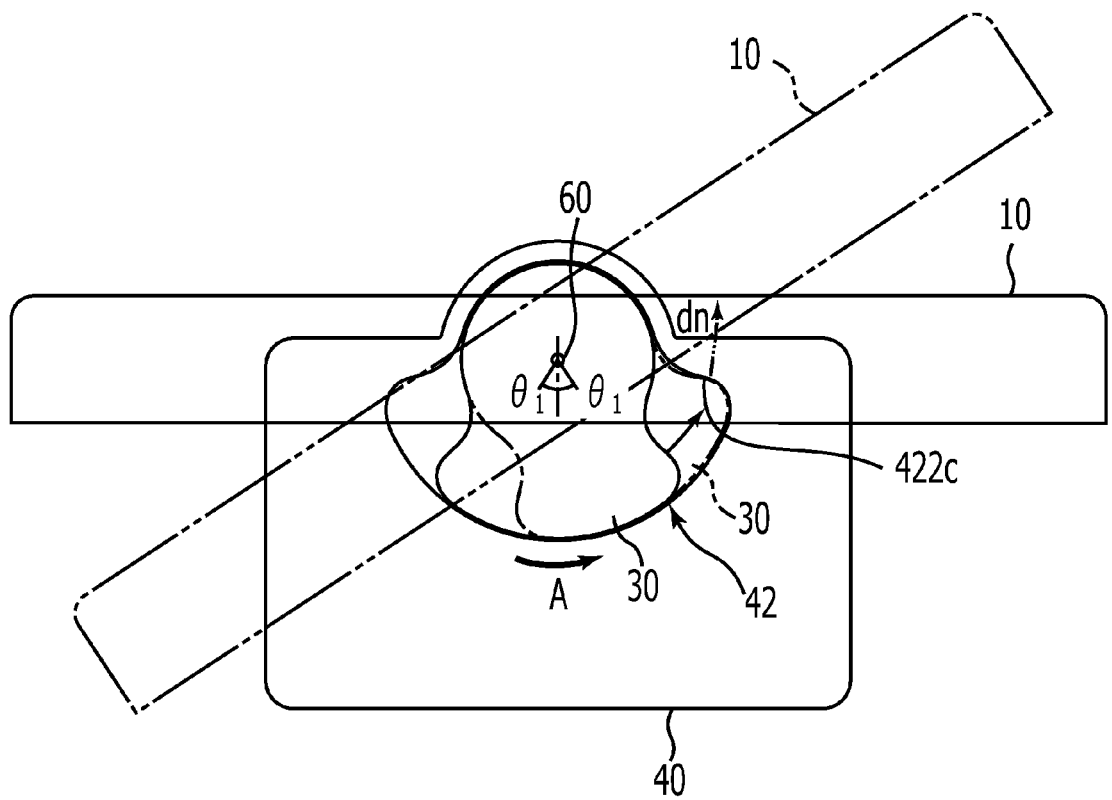
FIGS. 14A and 14B are diagrams explaining operations of the display body and those of the turning plate according to the first embodiment.
Figure 14B:
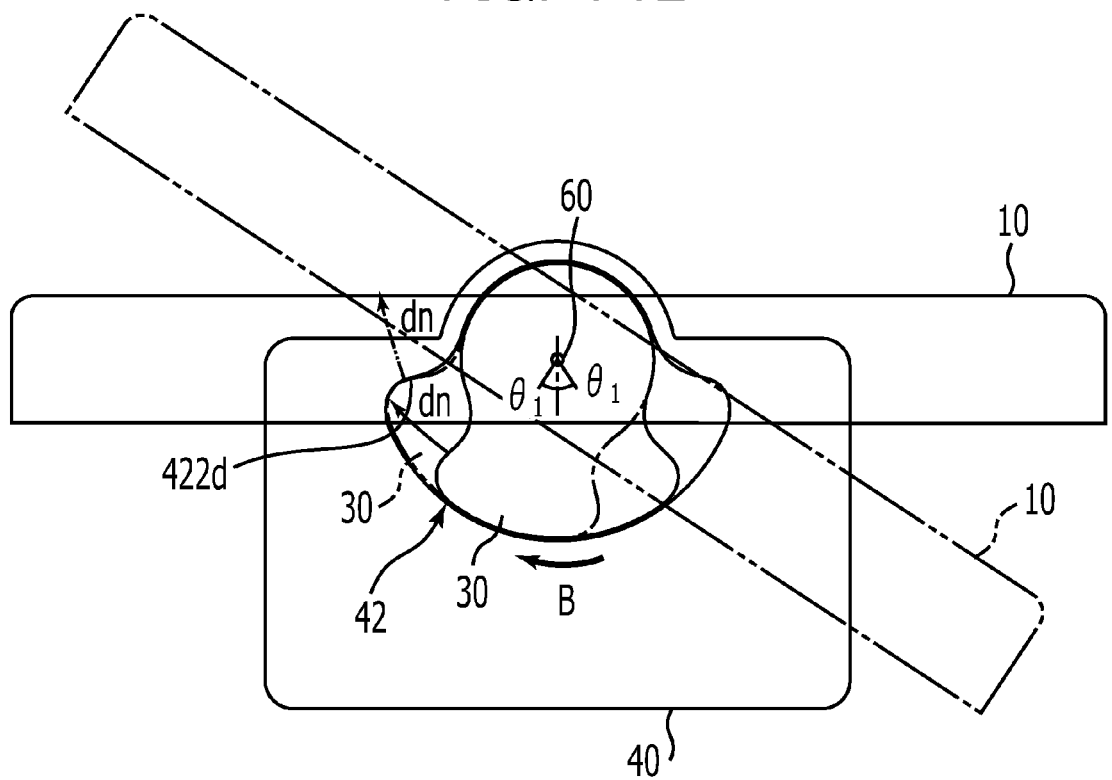

FIGS. 14A and 14B are diagrams explaining operations of the display body 10 and the turning plate 30 according to the first embodiment. FIG. 14A illustrates the turning plate 30 moved to its leftmost position (in the direction indicated by the arrow A). FIG. 14B illustrates the turning plate 30 moved to its rightmost position (in the direction indicated by the arrow B).

As illustrated in FIGS. 14A and 14B, when the user changes the orientation of the display screen 12a of the display body 10 in the display apparatus according to this embodiment, the user applies a load to the display body 10 to the left (as indicated by the arrow A in FIG. 14A) or to the right (as indicated by the arrow B in FIG. 14B). The load applied to the display body 10 is transmitted through the column body 221 to the turning plate 30 connected to the lower end of the column body 221. Accordingly, the turning plate 30 rotates about the shaft projection 60 in the gap G2 between the lower stationary plate 40 and the upper stationary plate 50. Thus, the display body 10 can be rotated to the left (as indicated by the arrow A in FIG. 14A) or to the right (as indicated by the arrow B in FIG. 14B) by a desired angle, as illustrated by a chain double-dashed line in FIG. 14A or 14B.

As described above, according to this embodiment, simply applying a load to the display body 10 will change the orientation of the display screen 12a of the display body 10 according to the user's preference.

The turning plate 30 according to this embodiment includes the first sliding part 321 which is arc-shaped about the shaft projection 60, the second sliding part 322 whose center coincides with the shaft projection 60, and the first and second connecting parts 323 and 324 connecting the first and second sliding parts 321 and 322. In other words, the turning plate 30 according to this embodiment is not exactly disk-shaped such that the center of the turning plate 30 coincides with the shaft projection 60. The turning plate 30 includes the first and second connecting parts 323 and 324 which are offset from the disk-shaped profile whose center coincides with the shaft projection 60.

Accordingly, when the turning plate 30 is rotated about the shaft projection 60, the first connecting part 323 or the second connecting part 324 of the turning plate 30 moves in the normal direction do to the side surface of the connecting part in the gap G2 between the lower stationary plate 40 and the upper stationary plate 50.

When the rotation angle of the display body 10, or the rotation angle of the turning plate 30 reaches the predetermined angle $\theta_1$, therefore, the first connecting part 323 or the second connecting part 324 of the turning plate 30 abuts against the first connecting wall part 424c or the second connecting wall part 424d of the lower stationary plate 40 as indicated by the chain double-dashed line in FIG. 14A or 14B, so that the range of rotation of the turning plate 30 is restricted. Thus, the display body 10 does not move to the rear of the column body 221.

In the display apparatus according to this embodiment, turning motion of the second sliding part 322 of the turning plate 30 for protecting the display apparatus from falling forward is used to restrict the rotation range of the turning plate 30, or the rotation range of the display body 10.

Consequently, special parts for restricting the rotation range of the display body 10 can be omitted. Thus, the manufacturing cost of the display apparatus can be reduced by a reduction in number of parts. Furthermore, the reduction in number of parts leads to simplified assembly of the display apparatus. Advantageously, the manufacturing cost of the display apparatus can be further reduced.

Second Embodiment

A second embodiment will be described below with reference to FIGS. 15 to 17. The description of the same components and operations as those in the first embodiment will be omitted.

Figure 15:
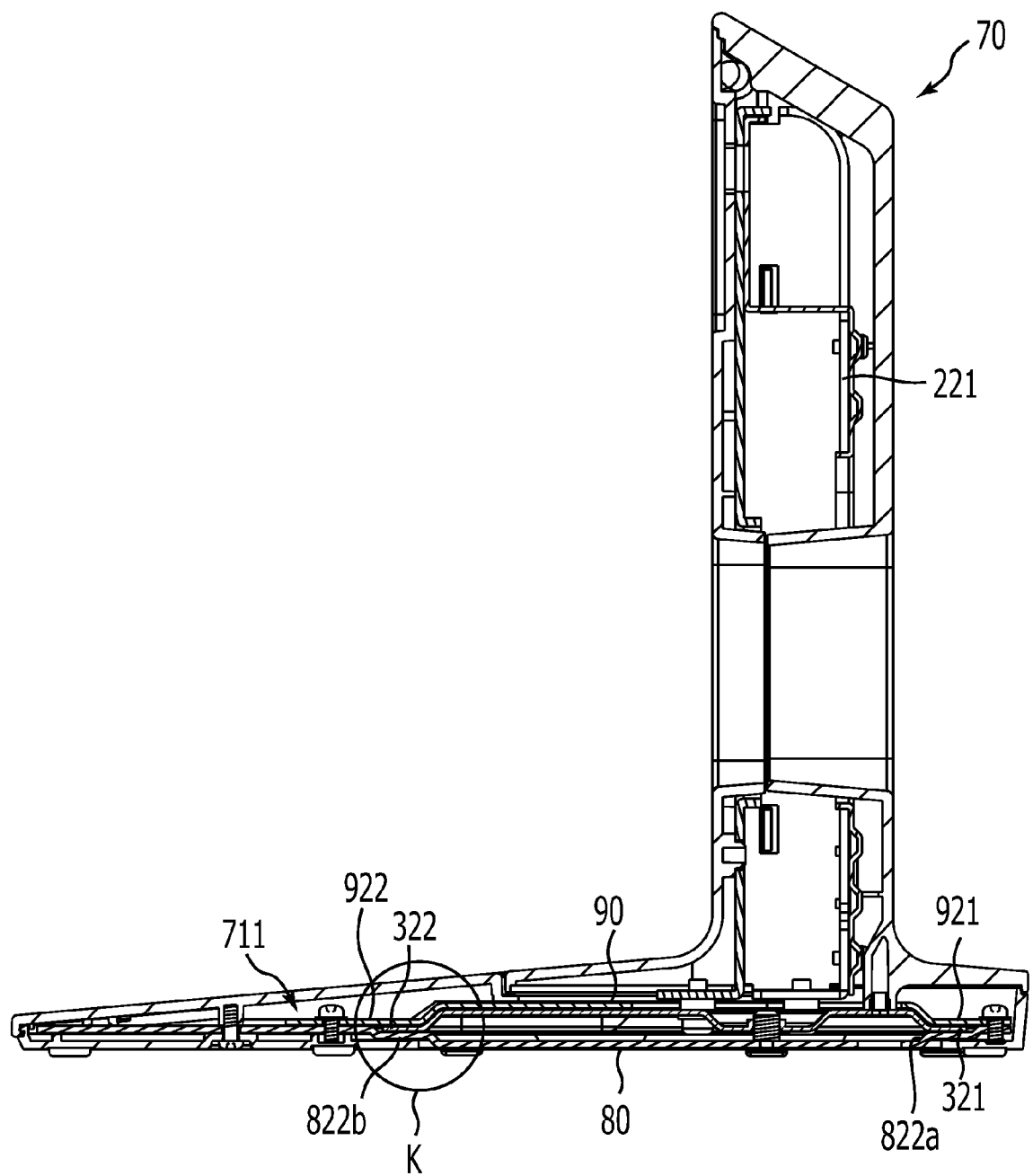
FIG. 15 is a sectional view of the support unit according to a second embodiment.

FIG. 15 is a sectional view of the support unit, indicated at 70, according to the second embodiment and illustrates a section corresponding to that of FIG. 3. FIG. 16 is an enlarged sectional view of the base body, indicated at 711, according to the second embodiment and illustrates a section surrounded by the circle K in FIG. 15. FIG. 17 is an exploded perspective view of the base body 711 according to the second embodiment.

Figure 16:
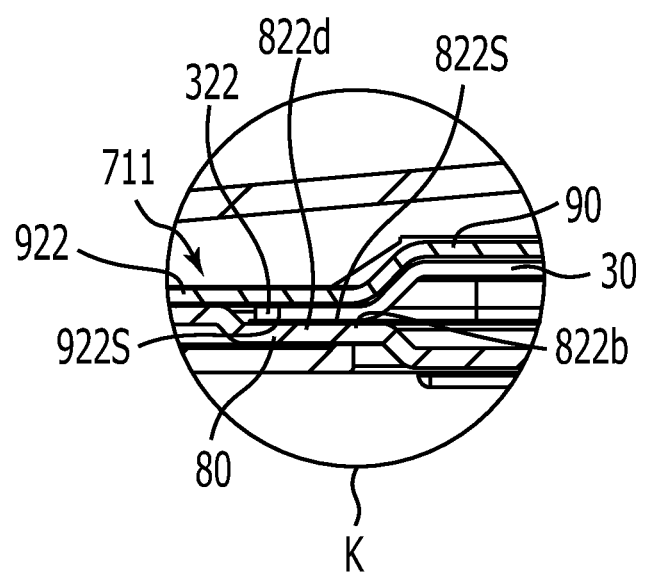
FIG. 16 is an enlarged sectional view of the base body according to the second embodiment.
Figure 17:
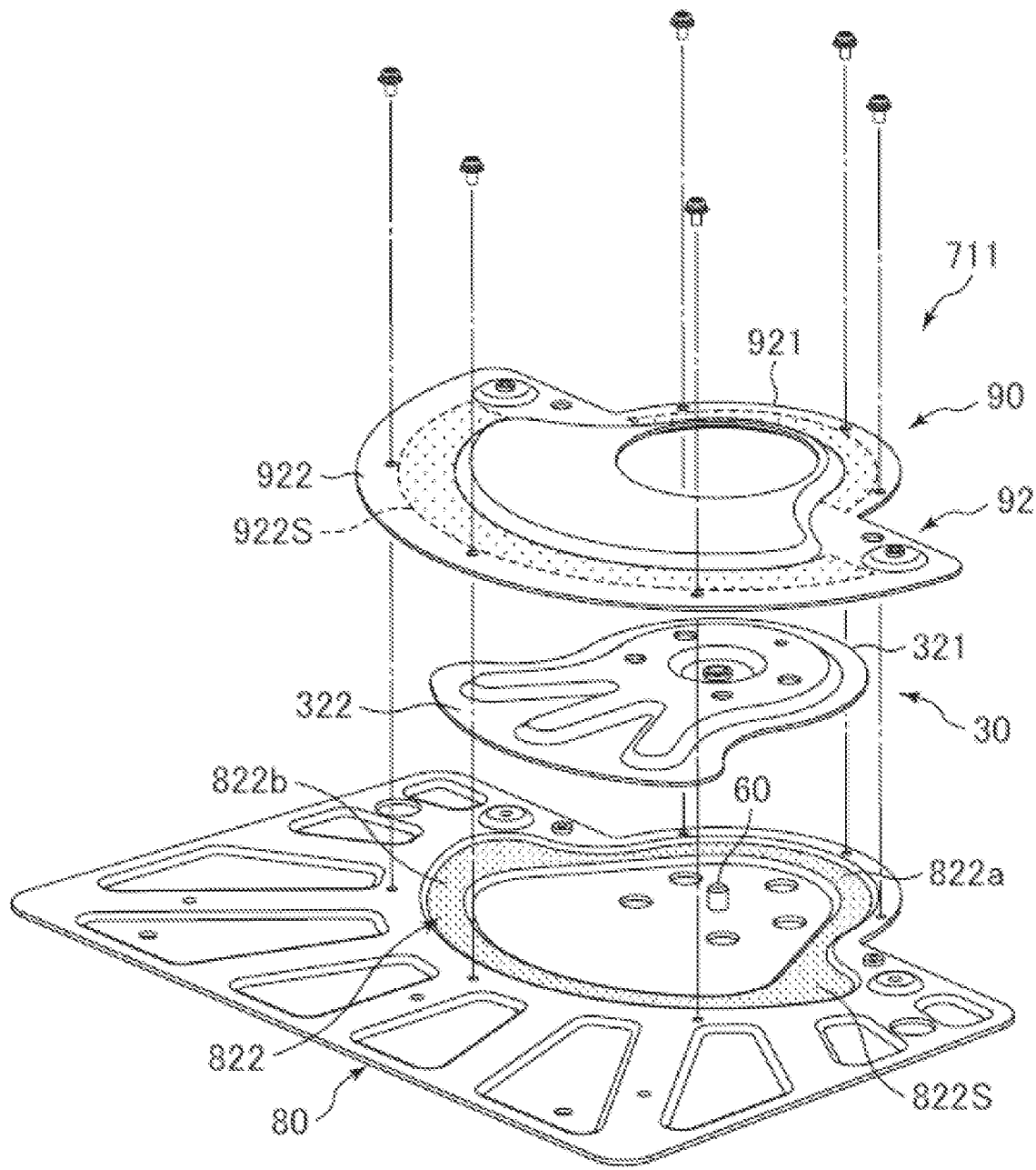
FIG. 17 is an exploded perspective view of the base body according to the second embodiment.

Referring to FIGS. 15 to 17, the base body 711 according to this embodiment includes a lower stationary plate 80. The lower stationary plate 80 includes a supporting portion 822 different from the supporting portion 422 according to the first embodiment. The supporting portion 822 is provided with a sliding plate 822S positioned so as to face the first and second sliding parts 321 and 322 of the turning plate 30, namely, positioned on the surface of first supporting part 822a and that of second supporting part 822b. The sliding plate 822S is configured to reduce the coefficient of friction between the first and second supporting parts 822a and 822b of the lower stationary plate 80 and the first and second sliding parts 321 and 322 of the turning plate 30. The sliding plate 822S is not particularly limited. Preferably, the sliding plate 822S is made of any material having a lower coefficient of friction than that of the surfaces of the first and second supporting parts 822a and 822b. In this embodiment, a polyethylene sheet, e.g., 3M™ Ultra High Molecular Weight (UHMW) Film Tape 5423 (registered trademark of Sumitomo 3M Ltd.), is used. Adhesive for bonding the sliding plate 822S to the first and second supporting parts 822a and 822b of the lower stationary plate 80 is not particularly limited. For example, Double-coated Adhesive Tape No. 5000NS (registered trademark of Nitto Denko Corporation) is used.

Furthermore, the base body 711 according to this embodiment includes an upper stationary plate 90. The upper stationary plate 90 includes a stationary portion 92 different from the stationary portion 52 according to the first embodiment. The stationary portion 92 is provided with a sliding plate 922S positioned so as to face the first and second sliding parts 321 and 322 of the turning plate 30, namely, positioned on the surface of first stationary part 921 and that of second stationary part 922. The sliding plate 922S is configured to reduce the coefficient of friction between the first and second stationary parts 921 and 922 of the upper stationary plate 90 and the first and second sliding parts 321 and 322 of the turning plate 30. The sliding plate 922S is not particularly limited. Preferably, the sliding plate 922S is made of any material having a lower coefficient of friction than that of the surfaces of the first and second stationary parts 921 and 922. In this embodiment, a polyethylene sheet, e.g., 3M™ UHMW Film Tape 5423 (registered trademark of Sumitomo 3M Ltd.), is used. Adhesive for bonding the sliding plate 922S to the upper stationary plate 90 is not particularly limited. For example, Double-coated Adhesive Tape No. 5000NS (registered trademark of Nitto Denko Corporation) is used.

As described above, the placement of the sliding plate 822S, which reduces the coefficient of friction between the first and second supporting parts 822a and 822b of the lower stationary plate 80 and the first and second sliding parts 321 and 322 of the turning plate 30, on the surface of the supporting portion 822 of the lower stationary plate 80 facilitates the turning plate 30 to turn. Advantageously, the orientation of the display screen 12a of the display body 10 can be changed by application of a small load to the display body 10. In addition, the placement of the sliding plate 922S, which reduces the coefficient of friction between the first and second stationary parts 921 and 922 and the first and second sliding parts 321 and 322 of the turning plate 30, on the surface of the stationary portion 92 of the upper stationary plate 90 further facilitates the turning plate 30 to turn. Advantageously, the orientation of the display screen 12a of the display body 10 can be changed by application of a smaller load to the display body 10.

Facilitation of turning of the turning plate 30 enables the turning plate 30 to be placed between the lower stationary plate 80 and the upper stationary plate 90 with little gap therebetween. Advantageously, the stability of the column body 221 supporting the display body 10 can be increased. In other words, the column body 221 can be supported without looseness.

Third Embodiment

A third embodiment will be described below with reference to FIGS. 18, 19A, and 19B. The description of the same components and operations as those in the first embodiment will be omitted.

Figure 18:
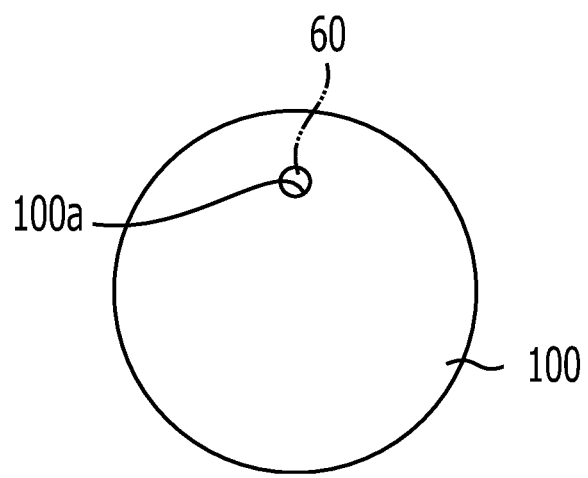
FIG. 18 is a plan view of the turning plate according to a third embodiment.

FIG. 18 is a plan view of the turning plate, indicated at 100, according to the third embodiment. FIGS. 19A and 19B are diagrams explaining operations of the display body 10 and the turning plate 100 according to the third embodiment. FIG. 19A illustrates the turning plate 100 moved to the leftmost position (in the direction indicated by the arrow A) and FIG. 19B illustrates the turning plate 100 moved to the rightmost position (in the direction indicated by the arrow B).

Referring to FIG. 18, the turning plate 100 according to this embodiment is generally disk-shaped and has a rotation support hole 100a rotatably supported by the shaft projection 60 such that the rotation support hole 100a is offset from the center of the turning plate 100.

Figure 19A:
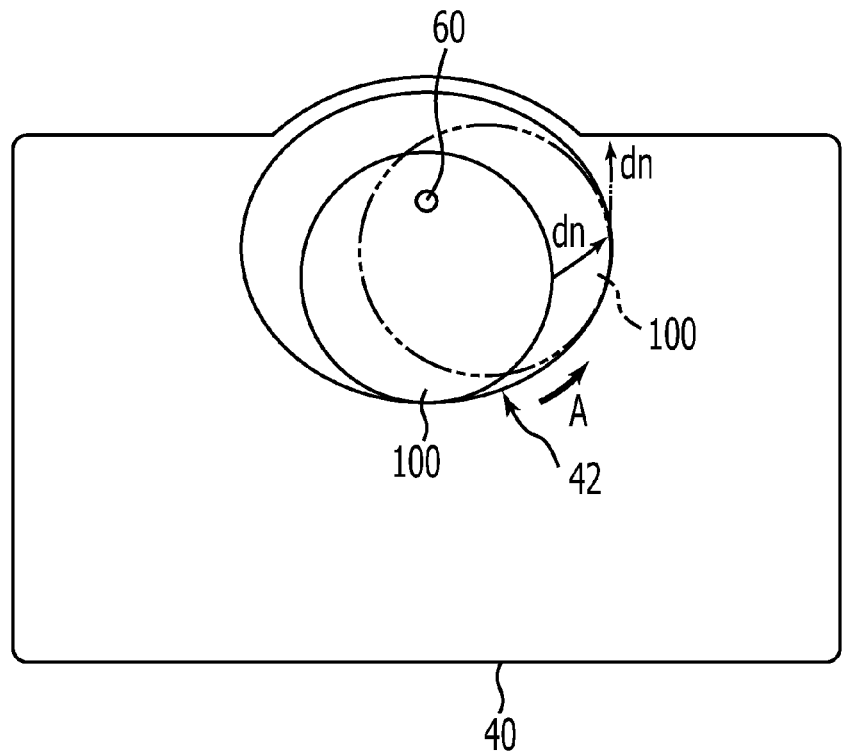
FIGS. 19A and 19B are diagrams explaining operations of the display body and those of the turning plate according to the third embodiment.
Figure 19B:
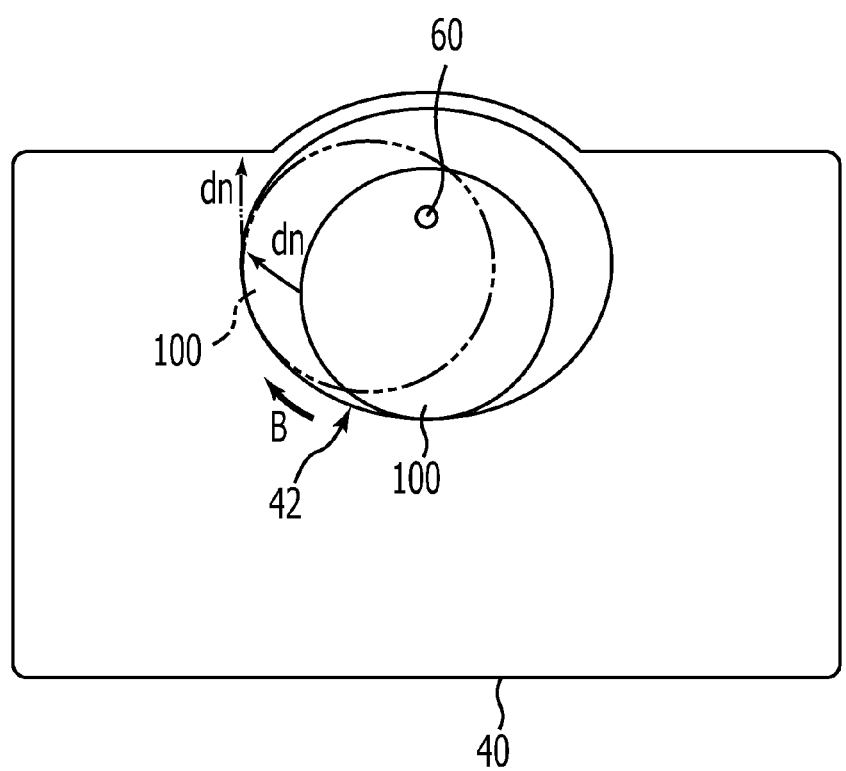

Accordingly, when the turning plate 100 is rotated to the left (refer to the arrow A in FIG. 19A) or to the right (refer to the arrow B in FIG. 19B) about the shaft projection 60 as illustrated in FIG. 19A or 19B, the side surface of the turning plate 100 moves in the normal direction do to the side surface. Arrangement of wall parts, which the turning plate 100 will abut against, in positions facing the side surfaces of the turning plate 100 enables the rotation range of the turning plate 100 to be restricted in the same way as in the first and second embodiments.

As described above, the turning plate according to each of the above-described embodiments is not limited provided that the turning plate is capable of turning together with the column body 221, which supports the display body 10, and restricting the rotation range of the turning plate while abutting against either of the wall parts arranged so as to face the side surfaces of the turning plate when being rotated by a predetermined angle.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic apparatus comprising:
   an electronic device;
   a column that supports the electronic device;
   a plate member connected to a lower end of the column;
   a support member that includes a lower plate segment disposed under the plate member and an upper plate segment disposed above the plate member and supports the plate member such that the plate member is allowed to swing between the lower plate segment and the upper plate segment; and
   a wall member that faces a side surface of the plate member to limit a total range of rotation of the plate member.

2. The electronic apparatus according to claim 1,
   wherein the support member supports the plate member such that the plate member rotates about an axis intersecting a surface of the lower plate segment or the upper plate segment.

3. The electronic apparatus according to claim 2,
   wherein the side surface moves in a direction along a normal to the side surface when the plate member rotates about the axis.

4. The electronic apparatus according to claim 2,
   wherein the plate member includes
   a first extending portion that extends on an opposite side to the electronic device with respect to the axis, and
   a second extending portion that extends on a same side as the electronic device with respect to the axis, a length of the second is larger than a length of the first extending portion with respect to the axis.

5. The electronic apparatus according to claim 2,
   wherein the plate member includes
   a first arc-shaped portion provided on an opposite side to the electronic device with respect to the axis and having a center coinciding with the axis, and
   a second arc-shaped portion provided on a same side as the electronic device with respect to the axis and having a radius of curvature greater than a radius of curvature of the first arc-shaped portion.

6. The electronic apparatus according to claim 1,
   wherein the wall member is continuously connected to an edge of the lower plate segment such that the wall member upwardly extends from the lower plate segment.

7. The electronic apparatus according to claim 1,
   wherein the plate member is supported to slide on the lower plate segment.

8. The electronic apparatus according to claim 1,
   wherein the lower plate segment includes a sliding plate that is in contact with the plate member such that the plate member is allowed to slide on the sliding plate.

* * * * *

UNITED STATES PATENT AND TRADEMARK OFFICE
CERTIFICATE OF CORRECTION

PATENT NO.      : 8,908,360 B2  
APPLICATION NO. : 13/547229  
DATED           : December 9, 2014  
INVENTOR(S)     : Kondo Page 1 of 1

It is certified that error appears in the above-identified patent and that said Letters Patent is hereby corrected as shown below:

On the Title Page, item (74), under "Attorney, Agent, or Firm", in Column 2, Line 1, delete "Machoff" and insert -- Maschoff --, therefor.

Signed and Sealed this  
Fourteenth Day of April, 2015

Michelle K. Lee  
*Director of the United States Patent and Trademark Office*